(12) United States Patent
Baccouche et al.

(10) Patent No.: US 11,007,907 B2
(45) Date of Patent: May 18, 2021

(54) SEAT BASE ASSEMBLY FOR A VEHICLE

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Johnathan Andrew Line, Northville, MI (US); Srinivasan Sundararajan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 16/299,657

(22) Filed: Mar. 12, 2019

(65) Prior Publication Data

US 2020/0290485 A1  Sep. 17, 2020

(51) Int. Cl.
- *B60N 2/14* (2006.01)
- *B60N 2/01* (2006.01)
- *B60N 2/06* (2006.01)

(52) U.S. Cl.
CPC ............ *B60N 2/14* (2013.01); *B60N 2/01* (2013.01); *B60N 2/06* (2013.01); *B60N 2205/35* (2013.01)

(58) Field of Classification Search
CPC ...... B60N 2/146; B60N 2/062; B60N 2/0717; B60N 2/08; B60N 2/143; B60N 2205/35; B60N 2/01; B60N 2/0252
USPC ....... 296/65.06, 64, 65.08, 68.1; 297/344.22, 297/344.24, 240, 256.12, 257
See application file for complete search history.

(56) References Cited

U.S. PATENT DOCUMENTS

| | | | |
|---|---|---|---|
| 5,000,505 A | 3/1991 | Kawashita et al. | |
| 5,951,106 A | 9/1999 | Hirama et al. | |
| 6,666,514 B2 * | 12/2003 | Muraishi | B60N 2/146 248/349.1 |
| 6,991,060 B2 * | 1/2006 | Chernoff | B60N 2/01 180/326 |
| 7,108,325 B2 | 9/2006 | Williamson et al. | |
| 7,357,451 B2 | 4/2008 | Bendure et al. | |
| 7,950,740 B2 | 5/2011 | Bunea et al. | |
| 9,493,242 B2 * | 11/2016 | Oleson | B60N 2/14 |
| 2003/0083063 A1 * | 5/2003 | Wang | H01Q 19/175 455/427 |
| 2009/0152907 A1 * | 6/2009 | Lee | B60N 2/14 297/1 |
| 2009/0195037 A1 | 8/2009 | Plavetich et al. | |
| 2019/0126783 A1 * | 5/2019 | Baccouche | B60N 2/0292 |

* cited by examiner

*Primary Examiner* — D Glenn Dayoan
*Assistant Examiner* — Sunsurraye Westbrook
(74) *Attorney, Agent, or Firm* — David Coppiellie; Price Heneveld LLP

(57) ABSTRACT

A seat base assembly includes a coupling member, a plurality of adjustment tracks coupled to the coupling member, and a plurality of seat legs, the plurality of seat legs includes at least one inner seat leg, and at least one outer seat leg, wherein the at least one inner seat leg and the at least one outer seat leg each comprise upturned bottom edges, and a lock assembly coupled to at least one of the plurality of seat legs.

20 Claims, 10 Drawing Sheets

SEAT BASE ASSEMBLY FOR A VEHICLE

FIELD OF THE DISCLOSURE

The present disclosure generally relates to a vehicle. More specifically, the present disclosure relates to a seat base assembly for a vehicle.

BACKGROUND OF THE INVENTION

Vehicles are often provided with a plurality of seat base assemblies for supporting users. Conventional seating assemblies are provided with an ability to adjust a horizontal position of the seating assembly to accommodate users of various heights and various comfort preferences. However, additional solutions are needed for seating assemblies in vehicles that enable greater degrees of customization to the user.

SUMMARY OF THE INVENTION

According to a first aspect of the present disclosure, a vehicle includes longitudinal rails coupled to a support structure. A dual circular track assembly is coupled to the longitudinal rails. The dual circular track includes an inner ring and an outer ring. The inner ring and the outer ring each include downturned top edges. A seat base assembly includes a coupling member, a plurality of adjustment tracks coupled to the coupling member, and a plurality of seat legs. The plurality of seat legs include at least one inner seat leg and at least one outer seat leg. The at least one inner seat leg and the at least one outer seat leg are each provided with upturned bottom edges.

Embodiments of the first aspect of the present disclosure can include any one or a combination of the following features:
  the seat base assembly further includes a lock assembly coupled to at least one of the plurality of seat legs such that the seat base assembly is retained in a desired position relative to the dual circular track assembly;
  the plurality of seat legs further includes a cross-bar configured to couple a first inner seat leg with a first outer seat leg;
  the support structure further includes a plurality of support beams coupled to a plurality of brackets;
  the plurality of seat legs further includes at least one front seat leg and at least one rear seat leg, wherein the at least one rear seat leg has a cross-section that is generally S-shaped when taken along a vertical plane;
  the plurality of seat legs further includes a front seat leg base and a rear seat leg base, wherein a first surface area of engagement between the rear seat leg base and the dual circular track assembly is greater than a second surface area of engagement between the front seat leg base and the dual circular track assembly;
  the front seat leg base and the rear seat leg base each further include an anterior base edge and a posterior base edge;
  the front seat leg base and the rear seat leg base each have an arcuate horizontal cross-section that extends between the anterior base edge and the posterior base edge; and
  the downturned top edges receive the upturned bottom edges such that the downturned top edges and the upturned bottom edges slidably couple with one another.

According to a second aspect of the present disclosure, a seat base assembly includes a plurality of adjustment tracks coupled to a coupling member. A lock assembly is coupled to at least one of a plurality of seat legs. The plurality of seat legs are received within a dual circular track assembly. The plurality of seat legs include at least one inner seat leg and at least one outer seat leg. The at least one inner seat leg and the at least one outer seat leg each include upturned bottom edges.

Embodiments of the second aspect of the present disclosure can include any one or a combination of the following features:
  the dual circular track assembly is coupled to longitudinal rails of a support structure of a vehicle and the dual circular track assembly includes an inner ring and an outer ring, wherein the inner ring and the outer ring each include downturned top edges that receive the upturned bottom edges of the at least one inner seat leg and the at least one outer seat leg;
  the plurality of seat legs further includes at least one front seat leg having a front seat leg base and at least one rear seat leg having a rear seat leg base, wherein the at least one rear seat leg has a cross-section that is generally S-shaped when taken along a vertical plane;
  a first surface area of engagement between the rear seat leg base and the dual circular track assembly is greater than a second surface area of engagement between the front seat leg base and a dual circular track assembly; and
  the front seat leg base and the rear seat leg base each include an anterior base edge and a posterior base edge, wherein the front seat leg base and the rear seat leg base each have an arcuate horizontal cross-section that extends between the anterior base edge and the posterior base edge.

According to a third aspect of the present disclosure, a seat base assembly includes a coupling member, a plurality of adjustment tracks coupled to the coupling member, a plurality of seat legs, and a lock assembly coupled to at least one of the plurality of seat legs. The plurality of seat legs includes at least one inner seat leg and at least one outer seat leg. The at least one inner seat leg and the at least one outer seat leg each include upturned bottom edges.

Embodiments of the third aspect of the present disclosure can include any one or a combination of the following features:
  the upturned bottom edges of the at least one outer seat leg and the at least one inner seat leg are configured to slidably couple with downturned top edges of an inner ring and an outer ring of a dual circular track assembly;
  the dual circular track assembly is coupled to a support structure of a vehicle;
  the support structure further includes a plurality of brackets and a plurality of support beams coupled to the plurality of brackets;
  the plurality of seat legs further includes at least one front seat leg having a front seat leg base and at least one rear seat leg having a rear seat leg base, wherein a first surface area of engagement between the rear seat leg base and the dual circular track assembly is greater than a second surface area of engagement between the front seat leg base and the dual circular track assembly;
  the at least one rear seat leg has a cross-section that is generally S-shaped when taken along a vertical plane;
  the front seat leg base and the rear seat leg base each include an anterior base edge and a posterior base edge;

the rear seat leg base and the front seat leg base each have an arcuate horizontal cross-section extending between the anterior base edge and the posterior base edge; and the plurality of seat legs further includes a crossbar configured to couple a first inner seat leg with a first outer seat leg.

These and other aspects, objects, and features of the present disclosure will be understood and appreciated by those skilled in the art upon studying the following specification, claims, and appended drawings.

BRIEF DESCRIPTION DRAWINGS

DETAILED DESCRIPTION OF THE PREFERRED EMBODIMENTS

Figure 1A:
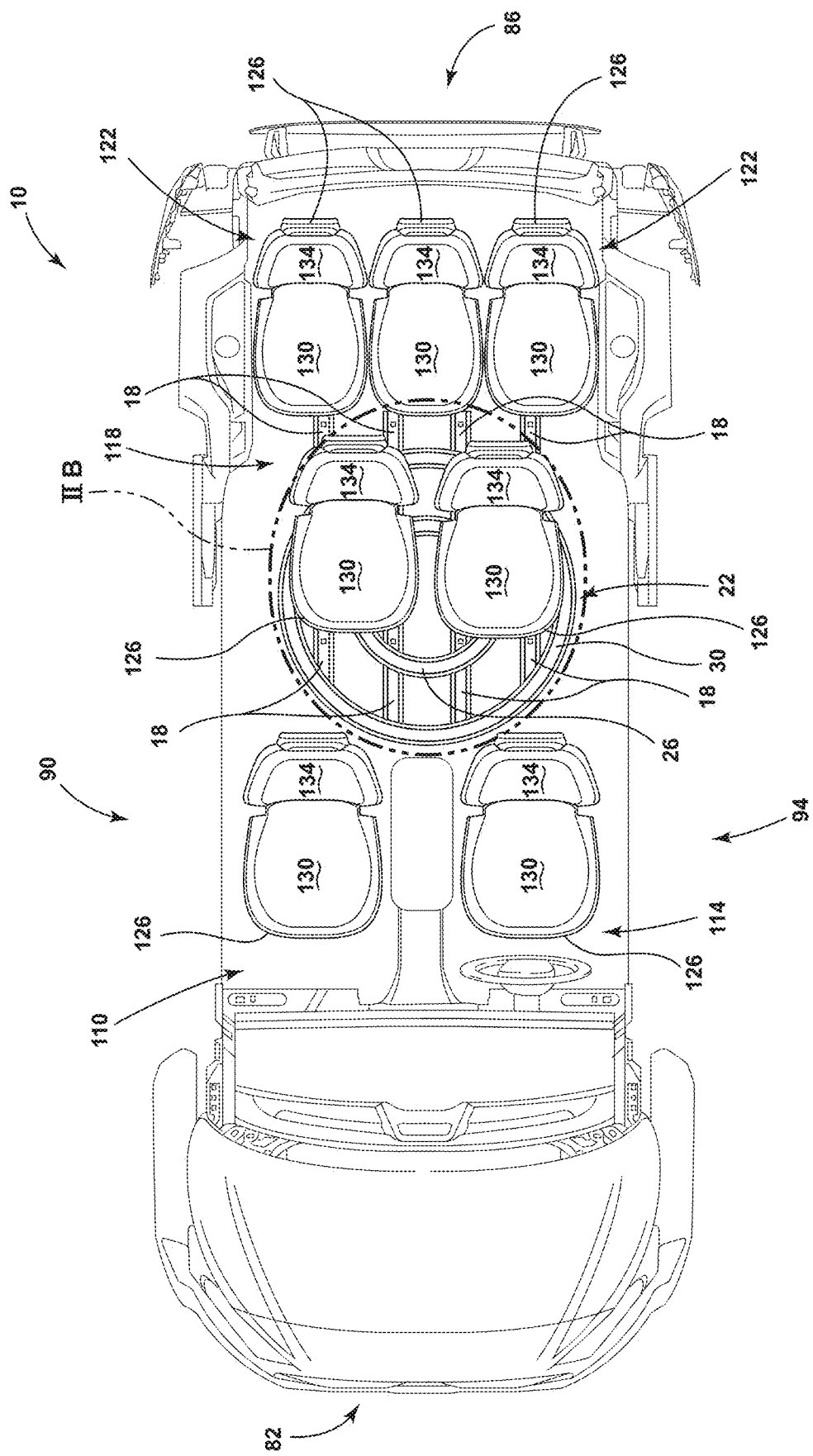
FIG. 1A is a top view of a dual circular track assembly installed in a vehicle, illustrating a front-facing orientation, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seat base assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1A-6B, a vehicle is generally designated by reference numeral 10. The vehicle 10 includes a support structure 14 and longitudinal rails 18 that couple to the support structure 14. A dual circular track assembly 22 is coupled to the longitudinal rails 18 and can include an inner ring 26 and an outer ring 30. In various examples, the inner ring 26 and the outer ring 30 each comprise downturned top edges 34. The vehicle 10 can also include a seat base assembly 38. The seat base assembly 38 can include a coupling member 42, a plurality of adjustment tracks 46 coupled to the coupling member 42, and a plurality of seat legs 50. The plurality of seat legs 50 can include at least one inner seat leg 54 and at least one outer seat leg 58. In some examples, the at least one inner seat leg 54 and the at least one outer seat leg 58 are each provided with upturned bottom edges 62. The plurality of seat legs 50 may also include a front seat leg 66, a rear seat leg 70, as well as the inner seat leg 54, and the outer seat leg 58. Said another way, the plurality of seat legs 50 may includes at least one front seat leg 66, at least one rear seat leg 70, at least one inner seat leg 54, and at least one outer seat leg 58. In another example, the plurality of seat legs 50 may also include a plurality of front seat legs 66, a plurality of rear seat legs 70, a plurality of inner seat legs 54, and a plurality of outer seat legs 58.

Referring again to FIGS. 1A and 1B, the vehicle 10 is equipped with the support structure 14 coupled to an underbody 78 of the vehicle 10. In various examples, the vehicle 10 may be a motor vehicle, such as a land vehicle, an air vehicle, or a watercraft. The vehicle 10 may be driver-based, semi-autonomous, or fully-autonomous. For example, in semi-autonomous examples, the vehicle 10 may monitor and execute routine traffic maneuvers (e.g., braking, accelerating, lane changes, turning, parking, engaging turn signals, etc.) while a user maintains override control. The vehicle 10 includes a front portion 82, a rear portion 86, a first side portion 90, and a second side portion 94. The longitudinal rails 18 are coupled to the underbody 78 of the vehicle 10. The longitudinal rails 18 may be coupled to the underbody 78 by fasteners 98. The fasteners 98 can include, but are not limited to, bolts, rivets, welds, interference fits, and/or combinations thereof. The longitudinal rails 18 may be constructed from a material that has a thickness in the range of 1.75 to 7 millimeters. For example, the longitudinal rails 18 may be constructed from a metal, a metal alloy, a composite material or the like. The dual circular track assembly 22 is coupled to the longitudinal rails 18. The dual circular track assembly 22 may be coupled to the longitudinal rails 18 by bolts, rivets, welds, interference fits, and/or combinations thereof.

Figure 1B:
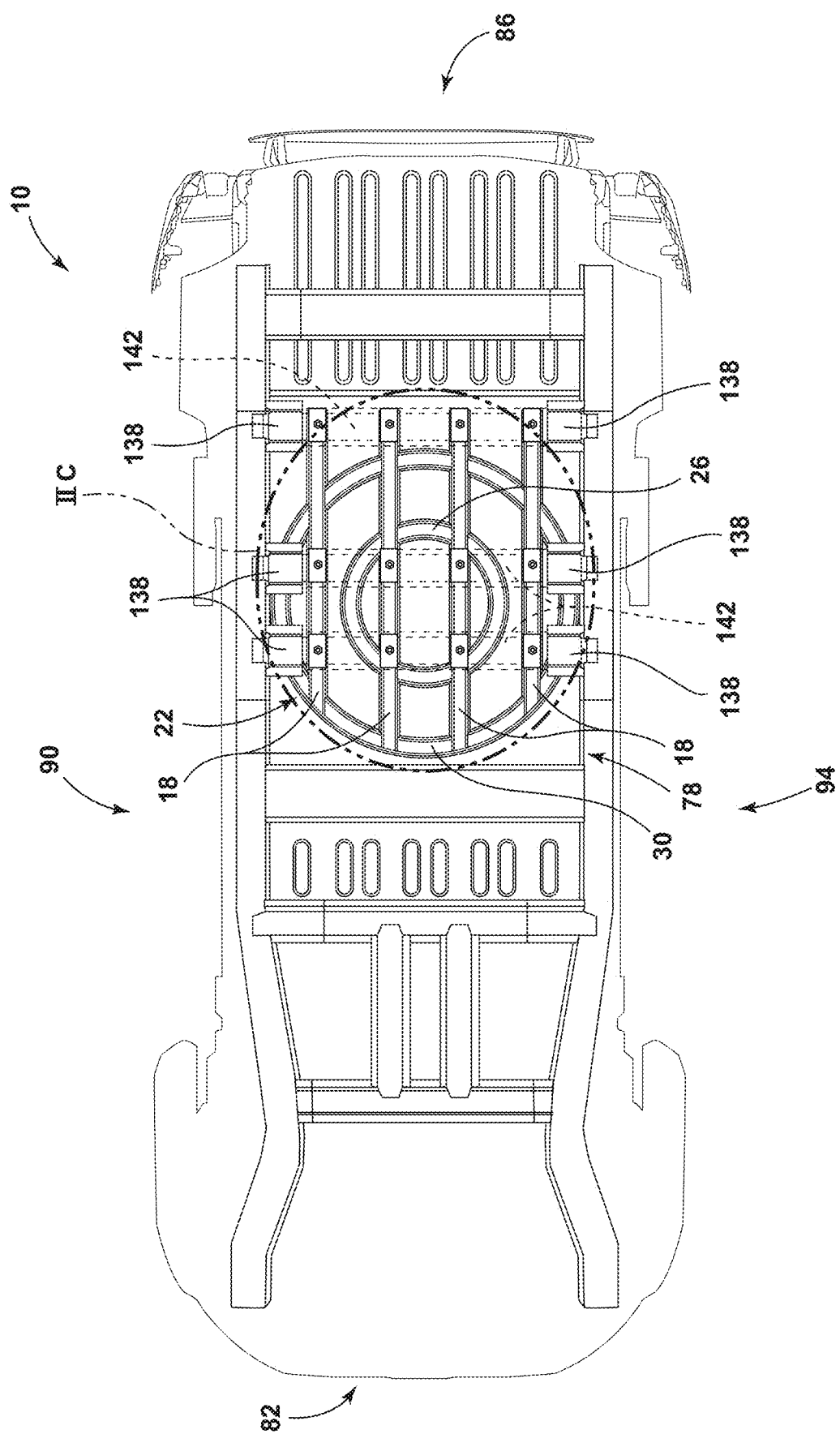
FIG. 1B is a bottom view of the dual circular track assembly installed the vehicle, according to one example.

Referring further to FIGS. 1A and 1B, the dual circular track assembly 22 can include the inner ring 26 and the outer ring 30 such that a concentric ring or circle formation is formed. In some examples, a diameter 102 of the inner ring 26 may be at least about 40 centimeters, at least about 50 centimeters, at least about 60 centimeters, at least about 70 centimeters, at least about 80 centimeters, and/or combinations or ranges thereof. In some examples, a diameter 106 of the outer ring 30 may be greater than 80 centimeters, greater than 90 centimeters, greater than 100 centimeters, at least 110 centimeters, at least 120 centimeters, at least 130 centimeters, at least 140 centimeters, at least 150 centimeters, at least 160 centimeters, at least 170 centimeters, at least 180 centimeters, and/or combinations or ranges thereof. In various examples, the diameter 106 of the outer ring 30 may be approximately twice the diameter 102 of the inner ring 26. It is contemplated, that diameter 106 of the outer ring 30 may be limited by the dimensions of the underbody 78 (e.g., a width 108 of the vehicle 10). Additionally or alternatively, the diameter 106 of the outer ring 30 may be limited by the proximity of adjacent rows of seating assemblies (e.g., a proximity of a second row to a third row or a proximity of the second row and a first row). In the depicted example, the diameter 102 of the inner ring 26 is taken from an inside portion of the inner ring 26; however, the diameter 102 may be taken at any point along the width 108 (see FIG. 6B) of the inner ring 26, In the depicted example, the diameter 106 of the outer ring 30 is taken from an inside portion of the outer ring 30; however, the diameter 106 may be taken at any point along the width 108 (see FIG. 6B) of the outer ring 30. The dual circular track assembly 22 can have a weight in the range of 15 to 30 kilograms. The dual circular track assembly 22 may be installed within a cabin 110 of the vehicle 10. For example, the vehicle 10 that is provided with the dual circular track assembly 22 may include a first row 114, a second row 118, and/or a third row 122 of seating assemblies 126. The seating assemblies 126 can include a seat 130 and a seat back 134 rotatably coupled to one another. The seat base assembly 38 can be coupled to the dual circular track assembly 22. The seat base assembly 38 can include the coupling member 42. The coupling member 42 can be integrally formed with the seat base assembly 38. Alternatively, the coupling member 42 can be formed as a separate component from the seat base assembly 38, which is then attached to the seat base assembly 38. In some examples, the coupling member 42 can be provided as a component of the seating assembly 126, which is attached to the seat base assembly 38 simultaneous to the attachment of the seating assembly 126 to the seat base assembly 38. In such an example, the coupling member 42 may be integrally formed with the seating assembly 126 or a component of the seating assembly 126. Alternatively, the coupling member 42 may be formed as a separate component from the seating assembly 126 and subsequently attached to the seating assembly 126. The dual circular track assembly 22 provides various rotational positions to one or more of the seating assemblies 126, and in some examples to an entire row (e.g., the first row 114, the second row 118, and/or the third row 122) of seating assemblies 126, to increase a level of configurability to the cabin 110 of the vehicle 10. For example, such an increase in the level of configurability of the cabin 110 can enable occupants to assume rotational positions that can be utilized to make ingress and egress from the cabin 110 easier, enable face-to-face conversations while remaining comfortably seated, enable side-facing configurations for appreciating scenery, create greater leg room, create greater cargo room while maintaining a seating capacity of the vehicle, and so on. The vehicle 10 may also include seating assemblies 126 that are not coupled to the dual circular track assembly 22. For example, one or more of the seating assemblies 126 can be provided within the vehicle 10 at locations that are vehicle-forward and/or vehicle-rearward of the dual circular track assembly 22. In such examples, the seating assemblies 126 that are not coupled to the dual circular track assembly 22 may be capable of fore-aft adjustment and/or individual swivel adjustments. Said another way, the seating assemblies 126 that are not coupled to the dual circular track assembly 22 can be capable of individual or group adjustments to be closer or farther away from adjacent rows of seating assemblies 126. Additionally or alternatively, the seating assemblies 126 that are not coupled to the dual circular track assembly 22 can be capable of rotating about individual vertical rotational axes, as opposed to the common vertical axis of rotation provided by the dual circular track assembly 22.

Figure 2A:
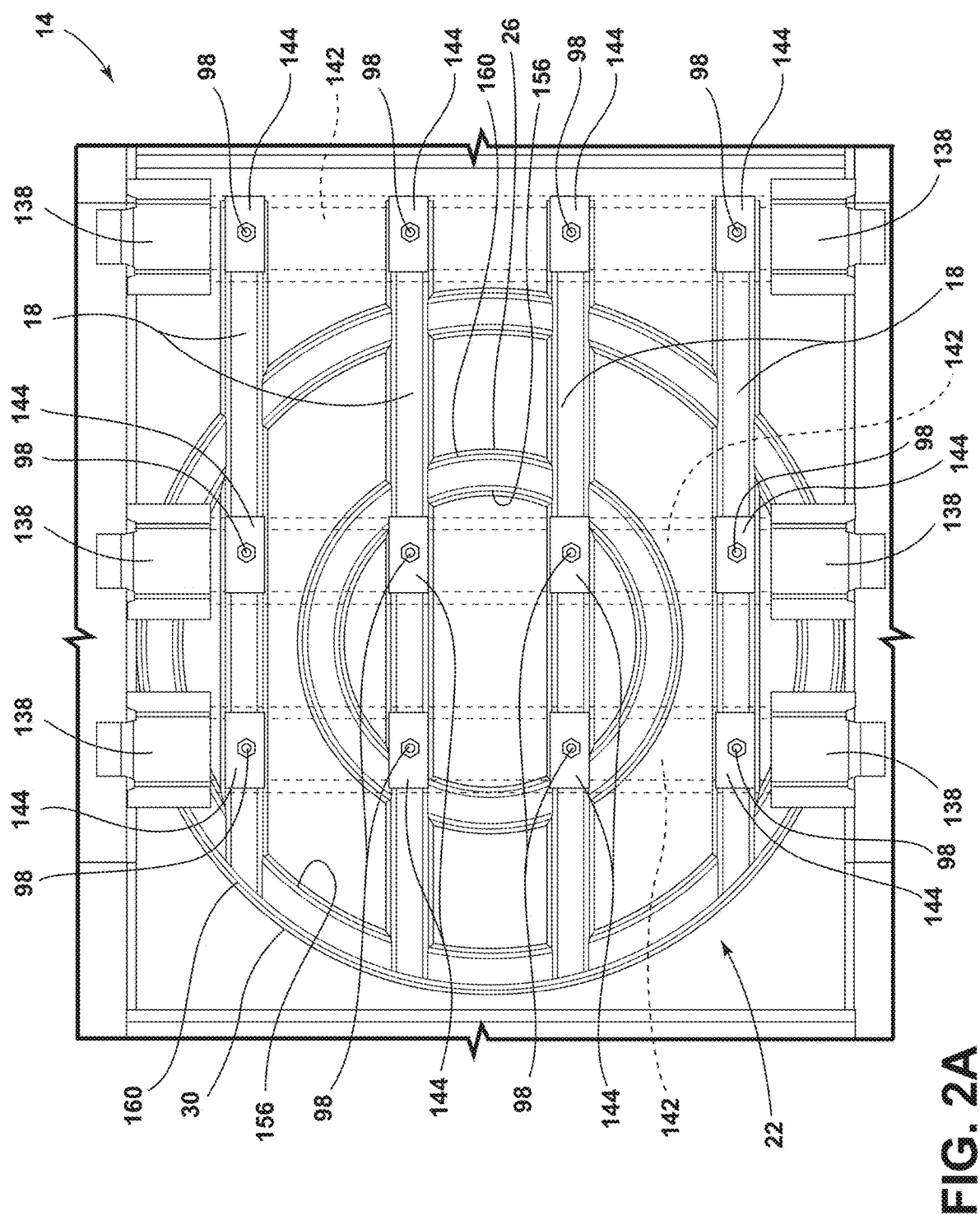
FIG. 2A is a bottom expanded view, taken at region IIC of FIG. 1B, of a support structure illustrating an engagement between the support structure and the dual circular track assembly, according to one example.
Figures 2B, 2C:
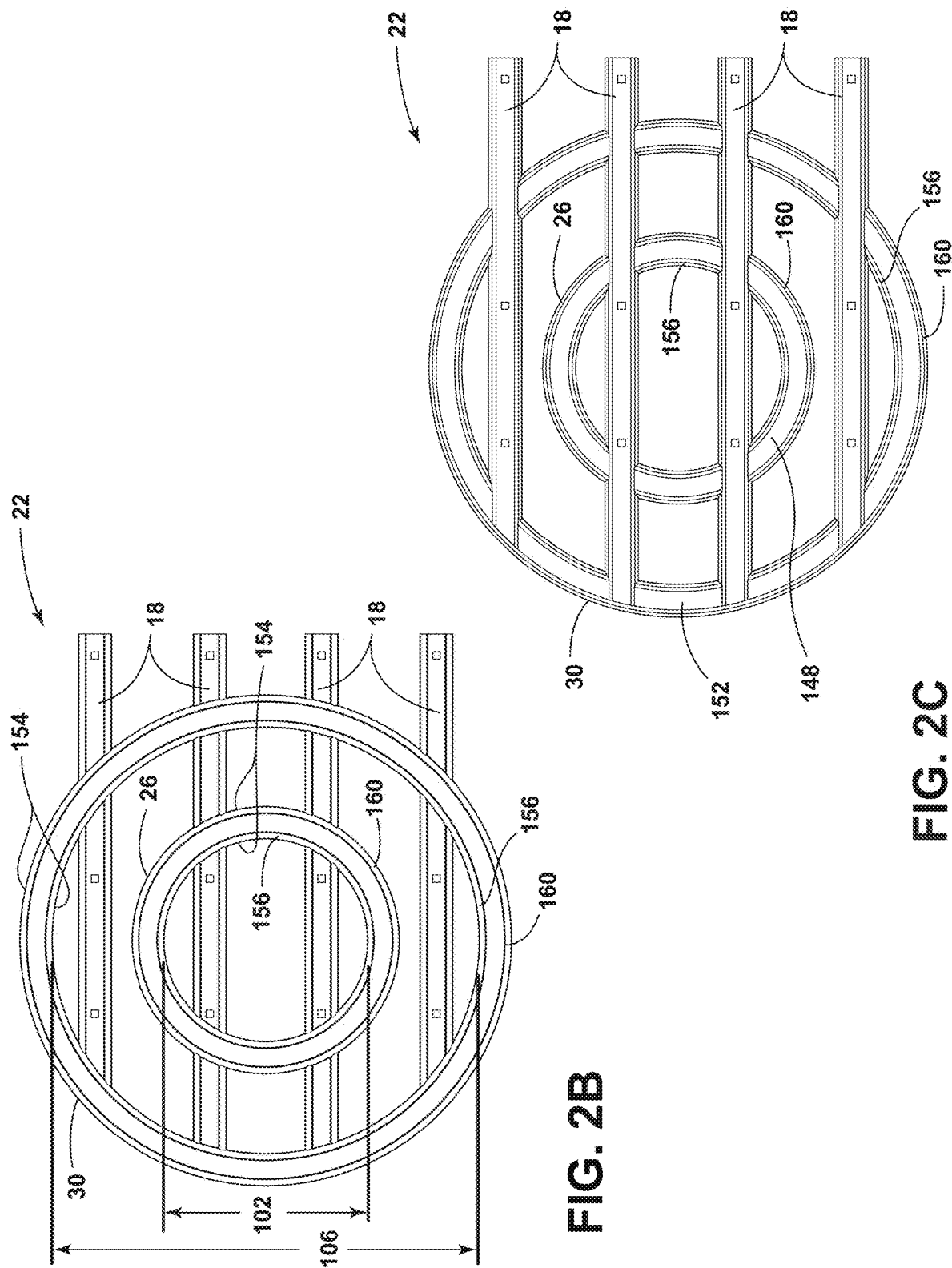
FIG. 2B is a top expanded view, taken at region IIB of FIG. 1A, of the dual circular track assembly, according to one example.
FIG. 2C is a bottom expanded view, taken at region IIC of FIG. 1B, of the dual circular track assembly, according to one example.

Referring now to FIGS. 2A-2C, the support structure 14 in the depicted example has three x-member brackets 138 with multiple support beams 142. Said another way, in the depicted example the support structure 14 has a plurality of brackets 138 with a plurality of support beams 142. The support structure 14 is incorporated in the vehicle 10, that is, the support structure 14 is shaped during the fabrication of the underbody 78. The longitudinal rails 18 are coupled to bulkheads 144 of the support beams 142 in multiple locations (e.g., three locations in the depicted example) on each of the support beams 142. The longitudinal rails 18 may be coupled to the bulkheads 144 using bolts, rivets, welding, and/or combinations thereof. The support beams 142 are of a wider construction than the longitudinal rails 18 and have raised edges. The raised edges of the support beams 142 form a crevice or channel in which the bulkheads 144 are positioned. The longitudinal rails 18 may be rails, tracks, beams, or any other similar structure that may be coupled with the x-member brackets 138. The bulkheads 144 are coupled to the longitudinal rails 18 at multiple points (e.g., four points in the depicted example) along the support beam 142. The longitudinal rails 18 are coupled to the dual circular track assembly 22. The longitudinal rails 18 may be coupled to the dual circular track assembly 22 via welding, fasteners, bolts, and/or combinations thereof. The inner ring 26 of the dual circular track assembly 22 is the smaller of the two concentric rings and is located within a circumference of the outer ring 30. In the depicted example, the inner ring 26 is coupled to at least two of the four longitudinal rails 18 (e.g., via welding). The longitudinal rails 18 may entirely intersect, cross, split, or otherwise traverse an under portion 148 of the inner ring 26. Said another way, a length of the longitudinal rails 18 can be greater than the diameter 102 of the inner ring 26. The outer ring 30 of the dual circular track assembly 22 is the larger of the two concentric rings and is located exterior to the inner ring 26. In the depicted example, similar to the inner ring 26, the outer ring 30 is coupled to all four of the longitudinal rails 18 (e.g., via welding). The longitudinal rails 18 may partially intersect, cross, split, or otherwise traverse a bottom portion 152 of the outer ring 30. Said another way, the length of the longitudinal rails 18 can be greater than the diameter 106 of the outer ring 30. The inner ring 26 and the outer ring 30 are provided with raised edges 154 to form a track or rail structure. The longitudinal rails 18 do not cross over the top portions of the dual circular track assembly 22. That is, the longitudinal rails 18 bisect the inner and outer rings 26, 30 of the dual circular track assembly 22, however, the longitudinal rails 18 do not compromise a continuous nature of interior and exterior perimeter walls 156, 160 of each of the inner and outer rings 26, 30. Said another way, the inner and outer rings 26, 30 are each provided with interior and exterior perimeter walls 156, 160 that at least partially define a generally U-shaped cross-section along a vertical plane and the interior and exterior perimeter walls 156, 160 are continuous in nature despite being coupled to the longitudinal rails 18. Accordingly, the longitudinal rails 18 couple with, and extend between, the inner and outer rings 26, 30 but do not penetrate the interior and exterior perimeter walls 156, 160 of the inner and outer rings 26, 30.

Figure 3A:
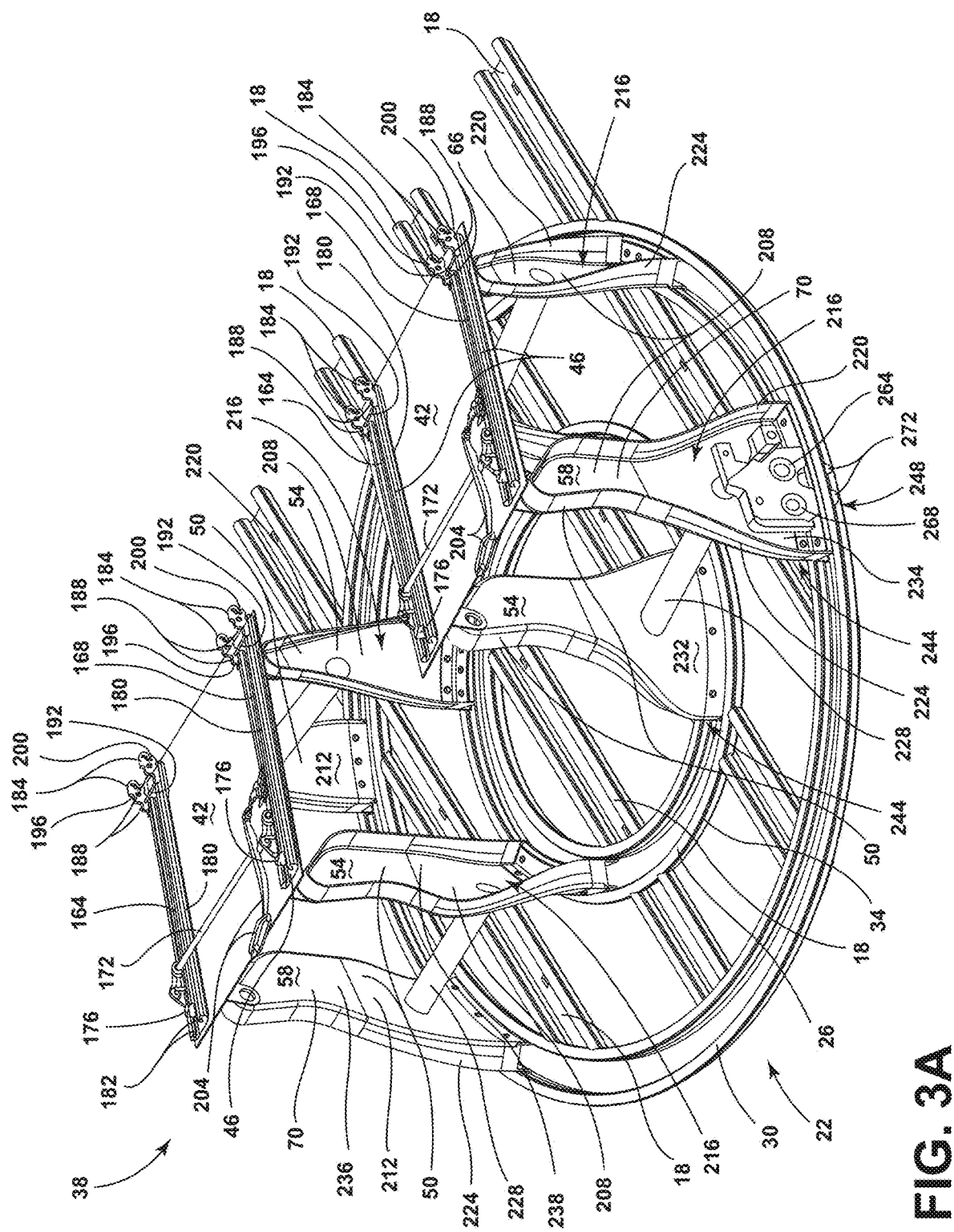
FIG. 3A is a top perspective view of the dual circular track assembly, illustrating seat base assemblies coupled to the dual circular track assembly, according to one example.
Figure 3C:
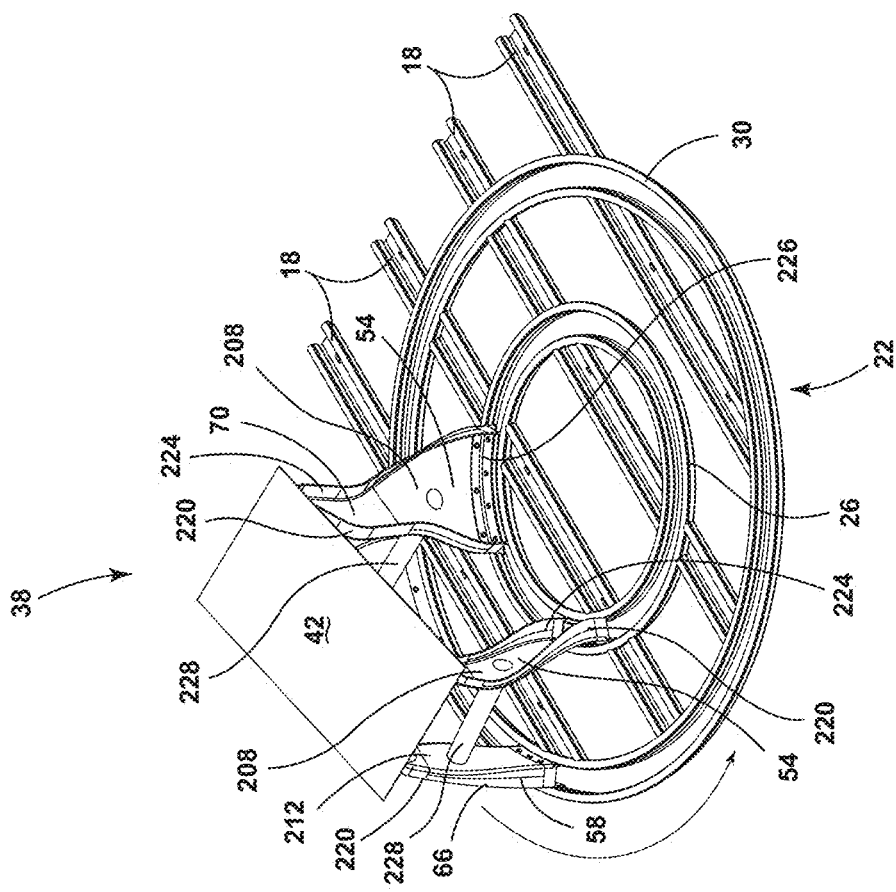
FIG. 3C is a top perspective view of the dual circular track assembly, illustrating yet another alternative location for the seat base assembly along the dual circular track assembly, according to one example.
Figure 3B:
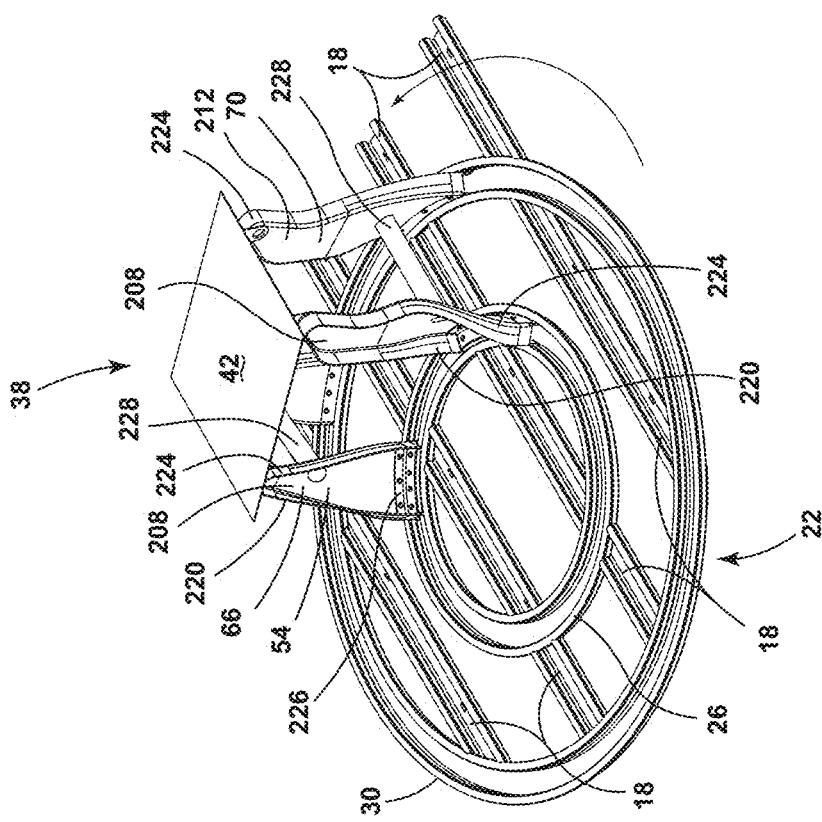
FIG. 3B is a top perspective view of the dual circular track assembly, illustrating an alternative location for the seat base assembly along the dual circular track assembly, according to one example.
Figure 4:
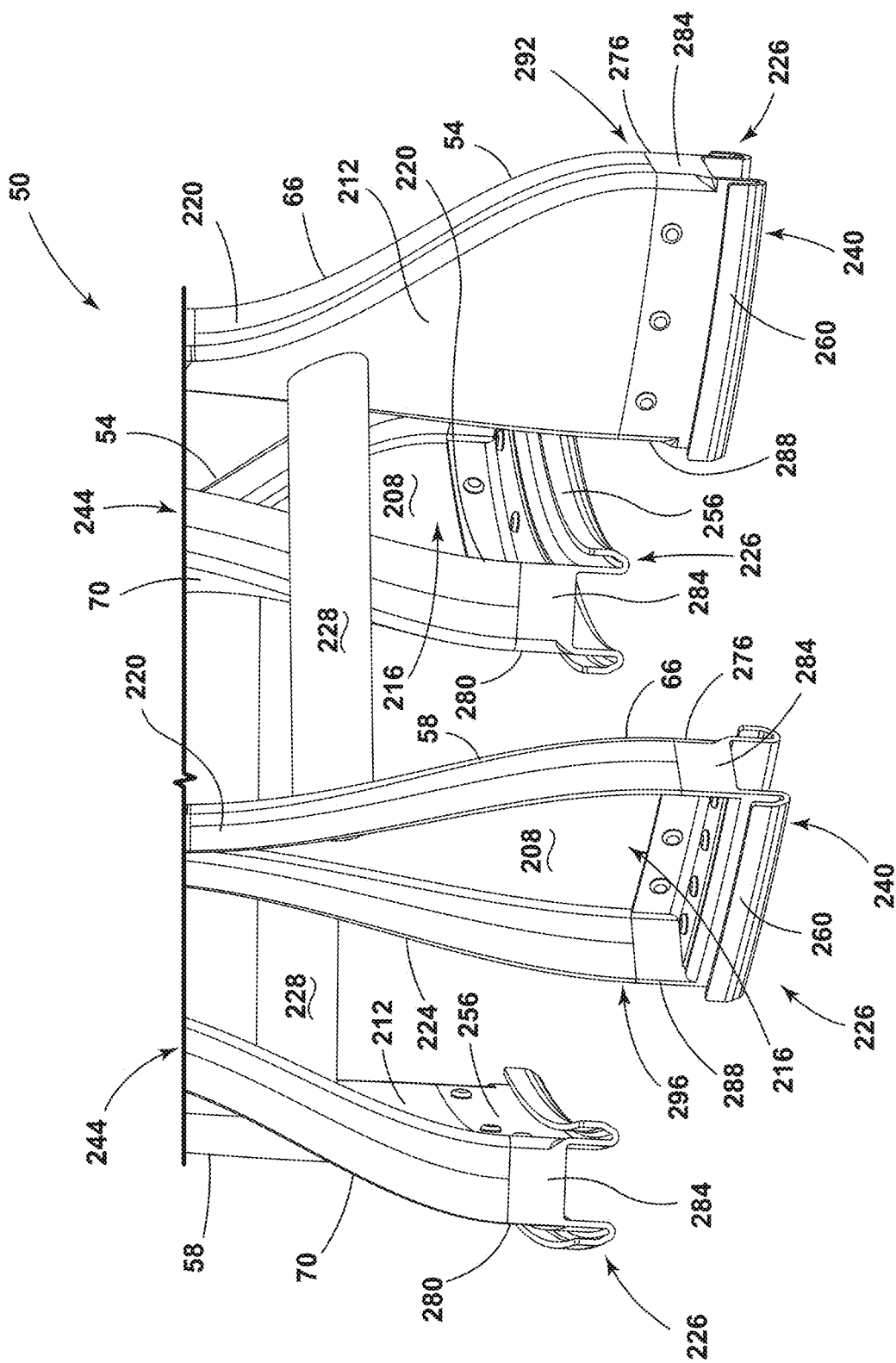
FIG. 4 is a front perspective view of the seat base assembly, illustrating a plurality of seat legs, according to one example.

Referring to FIGS. 3A-4, the seat base assembly 38 may be equipped with the plurality of adjustment tracks 46. In various examples, the coupling member 42 may be provided with the plurality of adjustment tracks 46 coupled thereto. The plurality of adjustment tracks 46 can slidably adjust the seating assembly 126 in a forward and a rearward direction relative to the seat base assembly 38. The plurality of adjustment tracks 46 include a first adjustment track 164 and a second adjustment track 168. The first adjustment track 164 can be coupled to the second adjustment track 168 by a crosspiece 172. The crosspiece 172 may include multiple guides 176 that may be slidably coupled to each of the first adjustment track 164 and the second adjustment track 168. The plurality of adjustment tracks 46 can include a rail 180 having upturned edges 182 that receive the multiple guides 176. The plurality of adjustment tracks 46 can also include multiple stoppers 184 that prevent the seating assemblies 126 from being actuated beyond the multiple stoppers 184. The multiple stoppers 184 can be provided with a curved edge 188 that may hook to the seating assembly 126. Additionally, the multiple stoppers 184 may define openings for fasteners that may further couple the multiple stoppers 184 to either the seat base assembly 38 or the seating assembly 126. The multiple stoppers 184 can also include a bar 192 that couples a first stopper 196 to a second stopper 200. At least one of the plurality of adjustment tracks 46 may be provided with a lever 204 configured to actuate the crosspiece 172 and/or the multiple guides 176 between a locked and an unlocked configuration such that forward and rearward slidable motion is enabled of the seating assemblies 126 relative to the seat base assembly 38. In various examples, a cross-section of the lever 204 may be round, triangular, rectangular, or any other suitable polygon. The lever 204 may be located towards the rear of the seat base assembly 38 or towards the front of the seat base assembly 38. However, it can be beneficial for the lever 204 to be easily accessible by both a user seated in the seating assembly 126 and a vehicle occupant not seated in the seating assembly 126 (e.g., a user preparing to enter the cabin 110 and desiring an initial adjustment prior to entry). The coupling member 42 may couple the seat base assembly 38 to the seating assembly 126. In one example, the coupling member 42 may be integrally formed with at least one of the seat base assembly 38 and the seating assembly 126. Alternatively, the coupling member 42 may be separately formed from the seat base assembly 38 and/or the seating assembly 126.

Referring again to FIGS. 3A-4, the seat base assembly 38 is coupled to the plurality of seat legs 50 that may include the front seat leg 66, the rear seat leg 70, the inner seat leg 54, and the outer seat leg 58. The inner seat leg 54 is positioned radially inward from the outer seat leg 58 such that the inner seat leg 54 is coupled to the inner ring 26. Similarly, the outer seat leg 58 is positioned radially outward or laterally displaced from the inner seat leg 54 such that the outer seat leg 58 is coupled to the outer ring 30. The front seat leg 66, as discussed herein, refers to the inner and outer seat legs 54, 58 that are vehicle-forward when the seating assembly 126 is in a front-facing position (i.e., facing toward the front portion 82 of the vehicle 10). The rear seat leg 70, as discussed herein, refers to the inner and outer seat legs 54, 58 that are vehicle-rearward when the seating assembly 126 is in a front-facing position (i.e., facing toward the front portion 82 of the vehicle 10). The plurality of seat legs 50 may have a first surface 208 and a second surface 212. The first surface 208 defines at least a portion of a recess 216. The plurality of seat legs 50 also includes a front brim 220 and a rear brim 224 that can each further define the recess 216. Additionally, a seat leg base 226 may further define the recess 216. The rear brim 224, the front brim 220, and the seat leg base 226 may extend from the first surface 208 of the plurality of seat legs 50 such that the first surface 208 provides a primary wall or a majority of the surface area that defines the recess 216. The first surface 208 and the second surface 212 of the front seat leg 66 may be generally bell shaped, triangular, A-shaped, trilateral, or other similar structural designs. Similarly, the first surface 208 and the second surface 212 of the rear seat leg 70 may be generally A-shaped, triangular, trilateral, or other similar structural designs. Alternatively, the front seat leg 66 may have a generally straight structure compared with the rear seat leg 70. The rear seat leg 70 may have a generally curved, twisted, arcuate, or turning structure compared with the front seat leg 66. The first surface 208 and the second surface 212 of the front seat leg 66 may have a smaller surface area than the first surface 208 and the second surface 212 of the rear seat leg 70. The rear seat leg 70 may have a generally serpentine or S-shaped cross-section when taken along a vertical plane. Alternatively, the rear seat leg 70 may have a cross-section with a generally sinusoidal curvature when taken along the vertical plane. The inner seat leg 54 may have a greater vertical curvature than the vertical curvature of the outer seat leg 58. Said another way, the radius of the turns that define the vertical curvature may differ between the inner seat leg 54 and the outer seat leg 58. Additionally or alternatively, the vertical curvature of the inner seat leg 54 may be defined by radial turns that differ (e.g., greater turning radius in a lower section and lesser turning radius in an upper section). Similarly, the vertical curvature of the outer seat leg 58 may additionally or alternatively be defined by radial turns that differ (e.g., greater turning radius in a lower section and lesser turning radius in an upper section). Said yet another way, the outer seat leg 58 may have a slight curvature along the vertical plane while the inner seat leg 54 may have a more pronounced curvature along the vertical plane.

Referring further to FIGS. 3A-4, a crossbar 228 may connect a first inner seat leg 232 with a first outer seat leg 234. Another, separate, crossbar 228 may also connect a second outer seat leg 236 with a second inner seat leg 238. The crossbars 228 may have a cross-section that is cylindrical in shape, circular in shape, triangular in shape, rectangular in shape, or any other suitable polygon. The crossbar 228 may be located between either a front pair of seat legs 240 or a rear pair of seat legs 244. A lock assembly 248 may be coupled to at least one of the plurality of seat legs 50. Additionally or alternatively, the lock assembly 248 may be coupled to at least one seat leg base 226. The lock assembly 248 may pass through an opening in the seat leg base 226 defined by a lateral base edge 256 and a medial base edge 260. The lock assembly 248 can be actuated between an engaged position and a disengaged position. The lock assembly 248 may include a first lock aperture 264 and a second lock aperture 268. The first lock aperture 264 and the second lock aperture 268 may each receive a locking pin 272 that is movable between an extended and a retracted position. The first lock aperture 264 and the second lock aperture 268 may be slidably coupled to the dual circular track assembly 22. The lock assembly 248 may be configured to control the rotational movement of the seat base assemblies 38 along the dual circular track assembly 22 such that unintentional motion of the seat base assemblies 38 relative to the dual circular track assembly 22 is prevented, particularly during impact events (e.g., vehicle-to-vehicle impacts or cargo-to-seat base assembly 38 impacts).

Referring still to FIGS. 3A-4, the plurality of seat legs 50 include the seat leg bases 226. Generally, the seat leg bases 226 may be coupled to the plurality of seat legs 50 using fasteners. The fasteners can include, but are not limited to, rivets, bolts, welding, and/or combinations thereof. Alternatively, the seat leg bases 226 may be integrally formed as one piece with the plurality of seat legs 50 such that there is no coupling portion between the seat leg base 226 and the seat leg 50. The plurality of seat legs 50 may be coupled to the coupling member 42 using rivets, bolts, welding, or any other suitable fastener. The plurality of seat legs 50 may also include a front seat leg base 276 and a rear seat leg base 280. The front seat leg base 276 and the rear seat leg base 280 are each provided with an anterior base edge 284 and a posterior base edge 288. The anterior base edge 284 and the posterior base edge 288 are determined when the seat base assembly 38, and the associated seating assembly 126, is positioned in a forward-facing direction (i.e., toward the front portion 82 of the vehicle 10). As used herein, the anterior base edge 284 and the posterior base edge 288 retain the positional designation despite being rotationally displaced from the forward-facing position by actuation along the dual circular track assembly 22. The front seat leg base 276 and the rear seat leg base 280 may have the lateral base edge 256 and the medial base edge 260. The lateral base edge 256 and the medial base edge 260 are determined when the seat base assembly 38 is positioned in the forward-facing position or direction (i.e., toward the front portion 82 of the vehicle 10). The lateral base edge 256 and the medial base edge 260 retain the positional designation despite being rotationally displaced from the forward-facing position by actuation along the dual circular track assembly 22.

Referring yet again to FIGS. 3A-4, a surface of engagement between the rear seat leg base 280 and the dual circular track assembly 22 is greater than a surface area of engagement between the front seat leg base 276 and the dual circular track assembly 22. Said another way, a first surface area of engagement between the rear seat leg base 280 and the dual circular track assembly 22 is greater than a second surface area of engagement between the front seat leg base 276 and the dual circular track assembly 22. Stated differently, the distance between the anterior base edge 284 and the posterior base edge 288 of the rear seat leg base 280 is greater than a distance between the anterior base edge 284 and the posterior base edge 288 of the front seat leg base 276. Said another way, the rear seat leg base 280 can have a greater surface area than a surface area of engagement than the front seat leg base 276. The front seat leg base 276 and the rear seat leg base 280 may have an arcuate cross-section extending between the anterior base edge 284 and the posterior base edge 288 of both the front seat leg base 276 and the rear seat leg base 280. That is to say, a cross-section of the front seat leg base 276 and the rear seat leg base 280, when taken along a horizontal plane, may be arcuate in shape. The inner seat leg 54 may have a more noticeable or pronounced arcuate cross-section taken at a base portion 292 of the inner seat leg 54. Said another way, a radius associated with the turn that gives rise to the arcuate cross-section of the inner seat leg 54 may be less than a radius associated with the turn that gives rise to the arcuate cross-section of the outer seat leg 58. Accordingly, the outer seat leg 58 may have a more gradual flexure, arc, or bend of a cross-section when taken along a horizontal plane at a base portion 296 of the outer seat leg 58. The seat base assembly 38 may rotate along the dual circular track assembly 22 in either the clockwise or the counterclockwise direction. The seat base assembly 38 can rotate along the dual circular track assembly 22 by gliding, sliding, rotating, or any other revolving movement.

Figure 5:
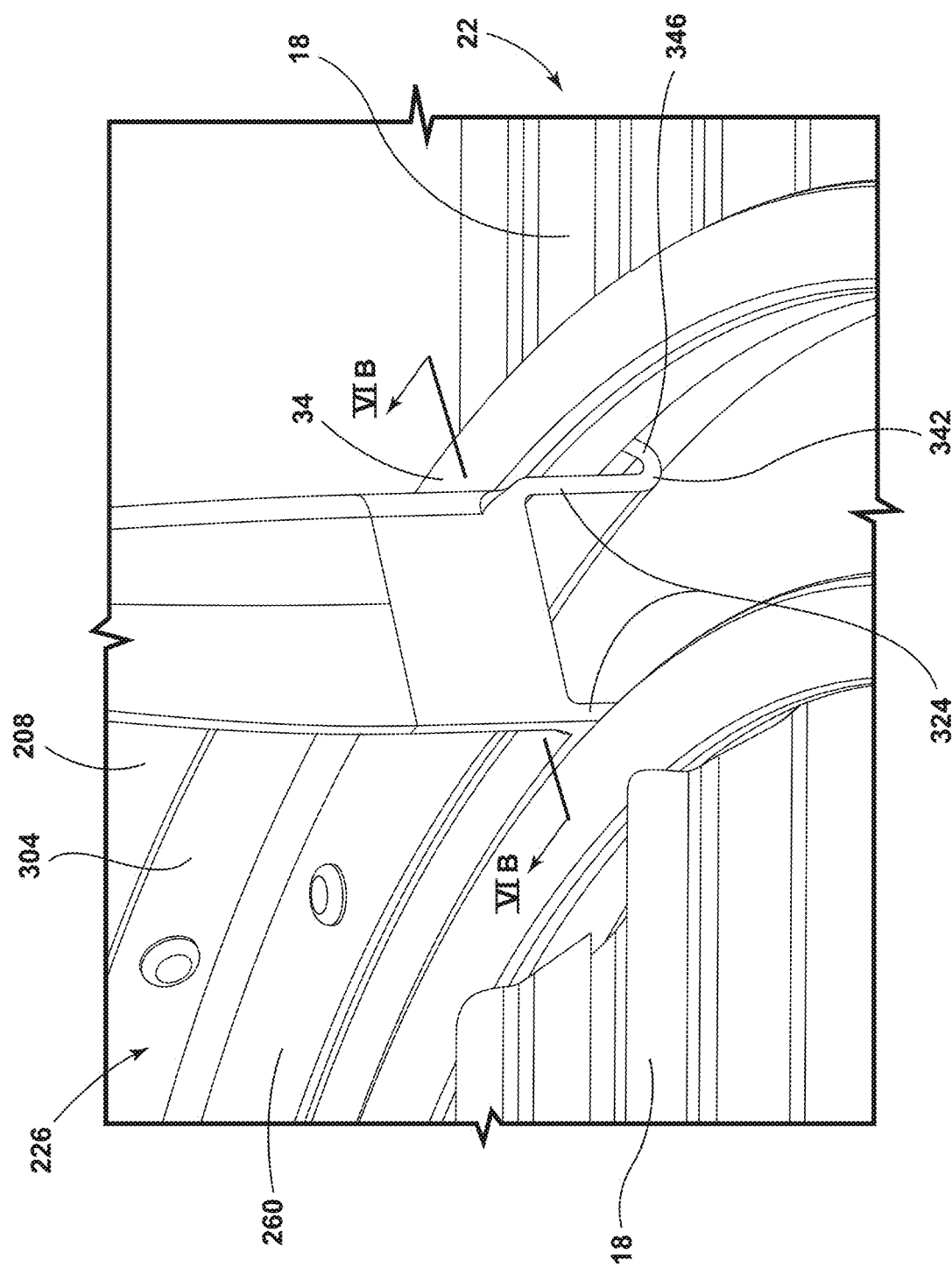
FIG. 5 is a front perspective view of a seat leg base, illustrating the engagement between the seat leg base and the dual circular track assembly, according to one example.
Figure 6A:
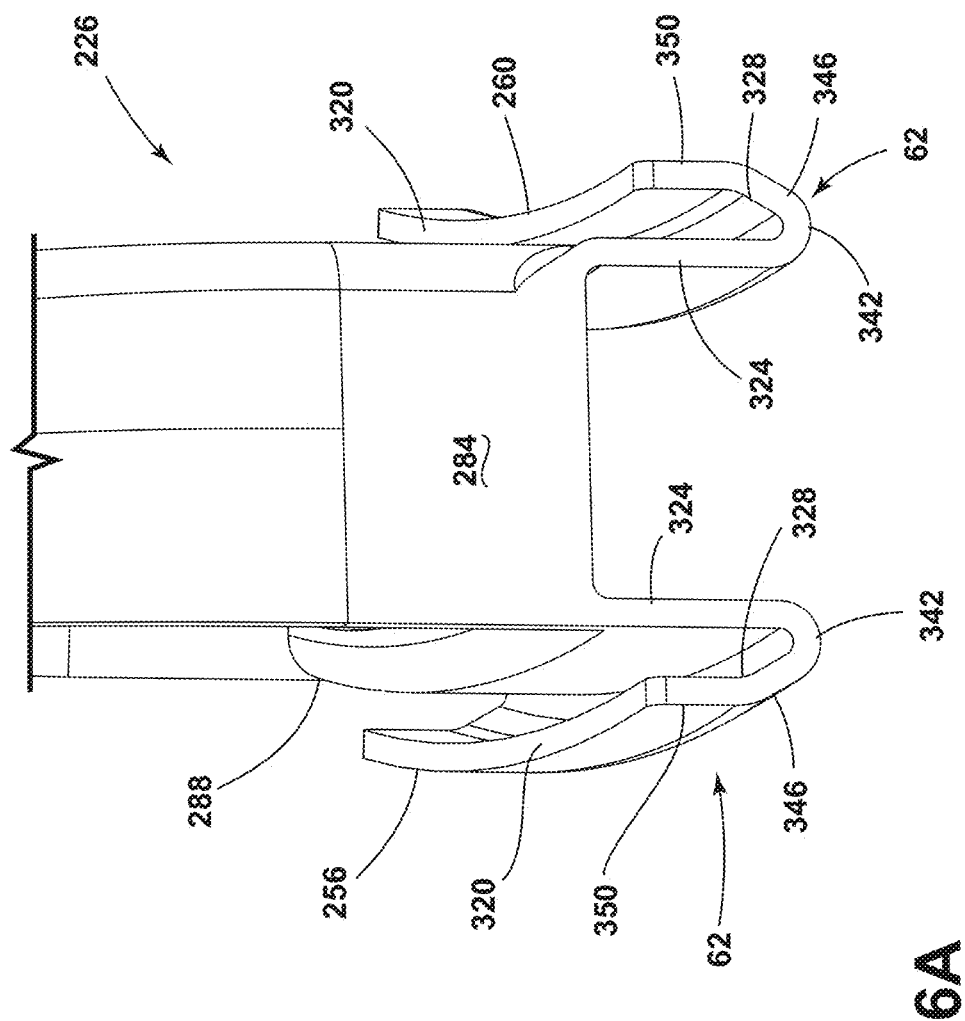
FIG. 6A is a front perspective cross-sectional view of the seat leg base, illustrating the curvature of the seat leg base, according to one example.
Figure 6B:
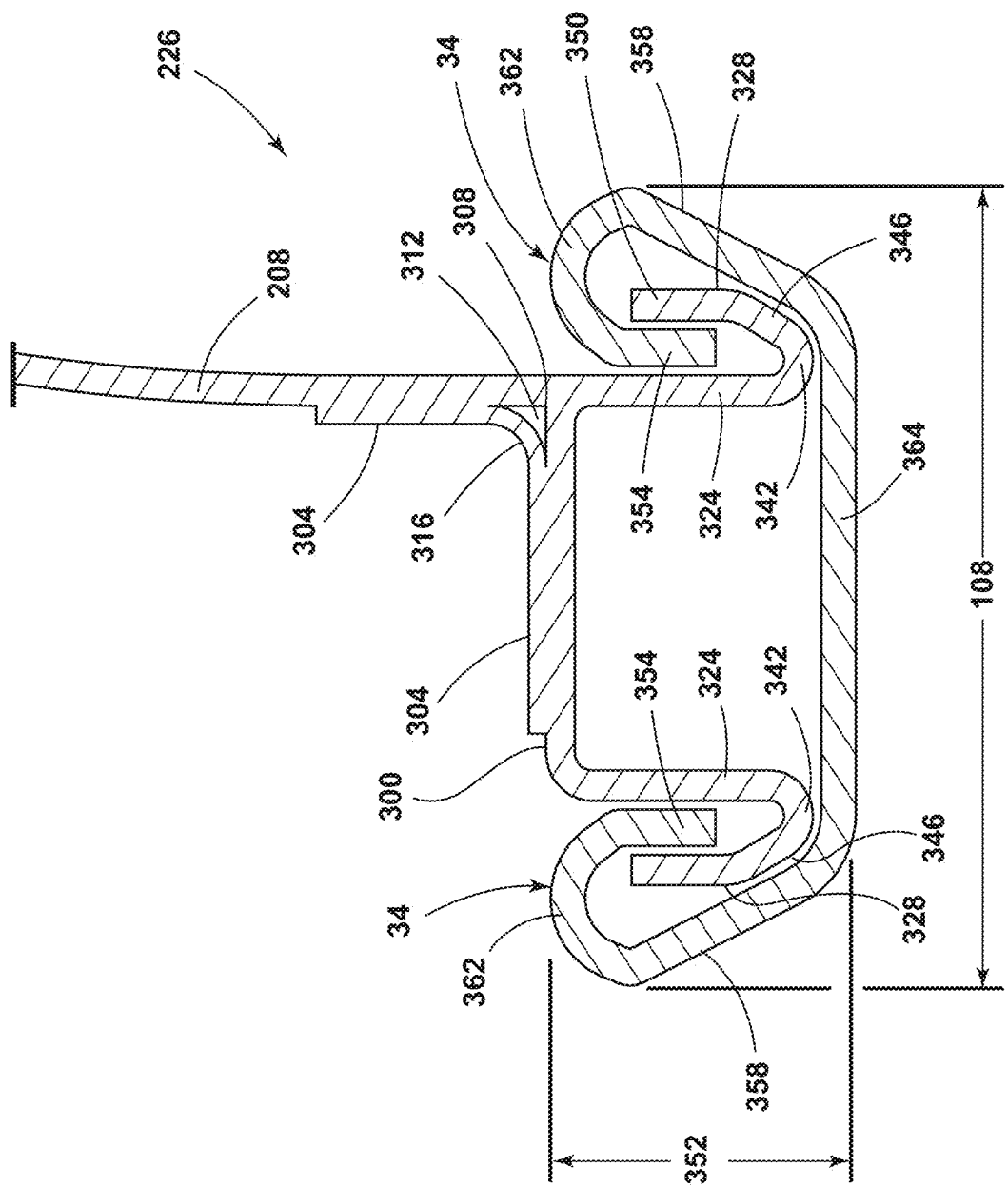
FIG. 6B is a cross-sectional view, taken along line VIB-VIB of FIG. 5, of the seat leg base and the dual circular track assembly, illustrating the engagement between the seat leg base and the dual circular track assembly, according to one example.

Referring to FIGS. 5-6B, the seat leg base 226 of the plurality of seat legs 50 may have a flat portion 300 with a brace 304. The brace 304 connects the first surface 208 of the seat leg 50 to the flat portion 300 of the seat leg base 226. The brace 304 may abut a sharp corner 308 defined by the first surface 208 and the seat leg base 226. Alternatively, there may be a gap 312 between a curved corner 316 of the brace 304 and the sharp corner 308 defined by the first surface 208 and the seat leg base 226. Examples that include the gap 312 between the curved corner 316 of the brace 304 and the sharp corner 308 defined by the first surface 208 may provide greater rigidity when exposed to impact loads imparted in a transverse direction relative to the direction the seating assembly 126 is facing. Such an increase in rigidity can be beneficial due to the seating assemblies 126 being capable of rotating in such a manner that greater impact energies may be experienced by the seat base assembly 38 and the seating assembly 126 than in a traditional, only forward-facing arrangement. For example, an occupant of the seating assembly 126 may be in a side-facing arrangement to enjoy scenery when a front-end impact, which can often be the greatest impact event, is experienced. Accordingly, the greater rigidity that can be provided where the seating assemblies 126, and ultimately the seat base assemblies 38, couples to the vehicle 10, the better, as inertial and torque arm forces act upon the seat base assembly 38. Specifically, with an occupant secured to the seating assembly 126, as the impact event begins, the occupant will tend to continue moving until the deceleration forces have acted upon the occupant. Such continued, inertial, movement creates a torque arm on the seat base assembly 38 by way of the weight of the occupant and the vertical displacement of the occupant relative to the seat base assembly 38. To further aid in retention and general guidance during rotational actuation, the seat leg base 226 may have the upturned bottom edges 62. The upturned bottom edges 62 may be described as U-shaped, parabolic, hook-shaped, or generally concave in shape. The upturned bottom edges 62 may have an upper end 320. The upper end 320 may be flat, rounded, or peaked. The upturned bottom edges 62 may have a flat side 324 and an angular side 328. The flat side 324 and the angular side 328 may be connected by a contoured portion 342. The flat side 324 may extend either from the lateral base edge 256 of the seat leg base 226. The flat side 324 may also extend from the medial base edge 260 of the seat leg base 226. The angular side 328 extends upward and radially outward, when viewed at a cross-section such as is illustrated in FIG. 6B, to engage with the dual circular track assembly 22. The angular side 328 may bend such that there is an inclining portion 346 and a vertical portion 350. The angular side 328, the flat side 324, and the contoured portion 342 may be separately coupled to the seat leg base 226. Alternatively, the angular side 328, the flat side 324, and the contoured portion 342 may be integrally formed with the seat leg base 226. The upturned bottom edges 62 are configured to hook within downturned top edges 34 of the dual circular track assembly 22. The angular side 328 of the upturned bottom edges 62 can be received within the downturned top edges 34 of the dual circular track assembly 22. The width 108 of the dual circular track assembly 22 may be proportional with a height 352 of the dual circular track assembly 22 such that as the height 352 increases the width 108 also increases. The downturned top edges 34 may have a collinear side 354 and an oblique side 358. The collinear side 354 and the oblique side 358 may be connected by an arcuate rim 362. The oblique side 358 can be angularly coupled to a base portion 364 of the dual circular track assembly 22. The collinear side 354 is configured to fit between the angular side 328 and the flat side 324 of the upturned bottom edges 62 of the seat leg base 226. The collinear side 354, the oblique side 358, and the arcuate rim 362 may be separately coupled to the dual circular track assembly 22. Alternatively, the collinear side 354, the oblique side 358, and the arcuate rim 362 may be integrally formed with the dual circular track assembly 22. The downturned top edges 34 of the dual circular track assembly 22 are generally bell-shaped, an inverse U-shape, convex or generally tunnel shape. The seat leg base 226 may have an arcuate horizontal cross-section such that it may slidably and rotatably move or glide within the dual circular track assembly 22.

The dual circular track assembly 22 may be added to a current baseline model of the vehicle 10 without modification to the underbody 78. As a result, it is easier to make the vehicle 10 more adaptable for adaptive seating configurations. Additionally, the brace 304 of the seat leg base 226 may stabilize the seat base assembly 38 resulting in an increase in rigidity, which can be beneficial due to the seating assemblies 126 being capable of rotating in such a manner that greater impact energies may be experienced by the seat base assemblies 38 and the seating assemblies 126 than in a traditional, only forward-facing arrangement.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle comprising:
   a support structure;
   longitudinal rails coupled to the support structure;
   a dual circular track assembly coupled to the longitudinal rails, the dual circular track assembly comprising:
      an inner ring; and
      an outer ring, wherein the inner ring and the outer ring each comprise downturned top edges; and
   a seat base assembly comprising:
      a coupling member;
      a plurality of adjustment tracks coupled to the coupling member; and
      a plurality of seat legs comprising:
         at least one inner seat leg operably coupled to the inner ring; and
         at least one outer seat leg operably coupled to the outer ring, wherein the at least one inner seat leg and the at least one outer seat leg are each provided with upturned bottom edges that couples with the downturned top edges.

2. The vehicle of claim 1, wherein the seat base assembly further comprises:
   a lock assembly coupled to at least one of the plurality of seat legs such that the seat base assembly is retained in a desired position relative to the dual circular track assembly.

3. The vehicle of claim 1, wherein the plurality of seat legs further comprise:
   a crossbar configured to couple a first inner seat leg with a first outer seat leg.

4. The vehicle of claim 1, wherein the support structure further comprises:
   a plurality of brackets; and
   a plurality of support beams coupled to the plurality of brackets.

5. The vehicle of claim 1, wherein the plurality of seat legs further comprises:
   at least one front seat leg; and
   at least one rear seat leg, wherein the at least one rear seat leg has a cross-section that is generally S-shaped when taken along a vertical plane.

6. The vehicle of claim 5, wherein the plurality of seat legs further comprises:
   a front seat leg base; and
   a rear seat leg base, wherein a first surface area of engagement between the rear seat leg base and the dual circular track assembly is greater than a second surface area of engagement between the front seat leg base and the dual circular track assembly.

7. The vehicle of claim 6, wherein the front seat leg base and the rear seat leg base each further comprise:
   an anterior base edge; and
   a posterior base edge.

8. The vehicle of claim 7, wherein the front seat leg base and the rear seat leg base each have an arcuate horizontal cross-section that extends between the anterior base edge and the posterior base edge.

9. The vehicle of claim 1, wherein the downturned top edges receive the upturned bottom edges such that the downturned top edges and the upturned bottom edges slidably couple with one another.

10. A seat base assembly comprising:
    a coupling member;
    a plurality of adjustment tracks coupled to the coupling member;
    a dual circular track assembly including an inner ring and an outer ring;
    a plurality of seat legs, wherein the plurality of seat legs are received within the dual circular track assembly, and wherein the plurality of seat legs comprise:
       at least one inner seat leg operably coupled to the inner ring; and
       at least one outer seat leg operably coupled to the outer ring, wherein the at least one inner seat leg and the at least one outer seat leg each comprise upturned bottom edges; and
    a lock assembly coupled to at least one of the plurality of seat legs.

11. The seat base assembly of claim 10, wherein the dual circular track assembly is coupled to longitudinal rails of a support structure of a vehicle
    and, wherein the inner ring and the outer ring each comprise downturned top edges that couple with the upturned bottom edges of the at least one inner seat leg and the at least one outer seat leg.

12. The seat base assembly of claim 10, wherein the plurality of seat legs further comprises:
    at least one front seat leg having a front seat leg base; and
    at least one rear seat leg having a rear seat leg base, wherein the at least one rear seat leg has a cross-section that is generally S-shaped when taken along a vertical plane.

13. The seat base assembly of claim 12, wherein a first surface area of engagement between the rear seat leg base and the dual circular track assembly is greater than a second surface area of engagement between the front seat leg base and the dual circular track assembly.

14. The seat base assembly of claim 12, wherein the front seat leg base and the rear seat leg base each further comprise:
    an anterior base edge; and a posterior base edge, wherein the front seat leg base and the rear seat leg base each have an arcuate horizontal cross-section that extends between the anterior base edge and the posterior base edge.

15. A seat base assembly comprising:
a coupling member;
a plurality of adjustment tracks coupled to the coupling member;
an inner ring;
an outer ring; and
a plurality of seat legs, the plurality of seat legs comprising:
   at least one inner seat leg operably coupled to the inner ring; and
   at least one outer seat leg operably coupled to the outer ring, wherein the at least one inner seat leg and the at least one outer seat leg each comprise upturned bottom edges; and
a lock assembly coupled to at least one of the plurality of seat legs.

16. The seat base assembly of claim 15, wherein the upturned bottom edges of the at least one outer seat leg and the at least one inner seat leg are configured to slidably couple with downturned top edges of the inner ring and the outer ring.

17. The seat base assembly of claim 16, wherein the inner ring and the outer ring comprise a dual circular track assembly, and wherein the dual circular track assembly is coupled to a support structure of a vehicle.

18. The seat base assembly of claim 17, wherein the plurality of seat legs further comprises:
   at least one front seat leg having a front seat leg base; and
   at least one rear seat leg having a rear seat leg base, wherein a first surface area of engagement between the rear seat leg base and the dual circular track assembly is greater than a second surface area of engagement between the front seat leg base and the dual circular track assembly.

19. The seat base assembly of claim 18, wherein the at least one rear seat leg has a cross-section that is generally S-shaped when taken along a vertical plane.

20. The seat base assembly of claim 18, wherein the front seat leg base and the rear seat leg base each further comprise:
   an anterior base edge; and
   a posterior base edge, wherein the rear seat leg base and the front seat leg base each have an arcuate horizontal cross-section extending between the anterior base edge and the posterior base edge.

* * * * *